United States Patent
Tanaka et al.

(10) Patent No.: US 8,814,749 B2
(45) Date of Patent: Aug. 26, 2014

(54) VEHICLE AND CONTROL METHOD FOR VEHICLE

(71) Applicants: Nobuyuki Tanaka, Toyota (JP); Masaya Amano, Toyota (JP); Kenji Uchida, Nagoya (JP); Yuki Hayakawa, Okazaki (JP); Go Hayasaka, Toyota (JP)

(72) Inventors: Nobuyuki Tanaka, Toyota (JP); Masaya Amano, Toyota (JP); Kenji Uchida, Nagoya (JP); Yuki Hayakawa, Okazaki (JP); Go Hayasaka, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 14/013,520

(22) Filed: Aug. 29, 2013

(65) Prior Publication Data
US 2014/0087917 A1  Mar. 27, 2014

(30) Foreign Application Priority Data
Sep. 27, 2012  (JP) ................ 2012-214349

(51) Int. Cl.
*B60K 1/02* (2006.01)
*B60W 10/06* (2006.01)
*B60W 10/08* (2006.01)
*B60W 20/00* (2006.01)
*B60K 28/10* (2006.01)

(52) U.S. Cl.
CPC .............. *B60K 28/10* (2013.01); *B60W 10/06* (2013.01); *B60W 20/40* (2013.01)
USPC ............................................. 477/3; 477/110

(58) Field of Classification Search
USPC .................................................... 477/3, 110
See application file for complete search history.

(56) References Cited

U.S. PATENT DOCUMENTS

| 2008/0053721 A1* | 3/2008 | Hoshiba et al. ............ 180/65.2 |
| 2008/0119319 A1* | 5/2008 | Kaya et al. ................... 477/3 |
| 2009/0118078 A1* | 5/2009 | Wilmanowicz et al. ....... 477/3 |

FOREIGN PATENT DOCUMENTS

JP   A-2004-92623   3/2004

* cited by examiner

*Primary Examiner* — Edwin A Young
(74) *Attorney, Agent, or Firm* — Oliff PLC

(57) ABSTRACT

A vehicle includes an accelerator pedal, a drive device and an electronic control unit (ECU). The drive device generates driving force for driving a wheel on the basis of an operation amount of the accelerator pedal. The ECU, while the vehicle is travelling in a ready-off state, prohibits a shift into a ready-on state until the operation amount of the accelerator pedal once becomes lower than a predetermined value.

12 Claims, 9 Drawing Sheets

VEHICLE AND CONTROL METHOD FOR VEHICLE

INCORPORATION BY REFERENCE

The disclosure of Japanese Patent Application No. 2012-214349 filed on Sep. 27, 2012 including the specification, drawings and abstract is incorporated herein by reference in its entirety.

BACKGROUND OF THE INVENTION

1. Field of the Invention

The invention relates to a vehicle and a control method for a vehicle and, more particularly, to a vehicle including a drive device that generates driving force for driving a wheel on the basis of an operation amount of an accelerator pedal, and a control method for the vehicle.

2. Description of Related Art

If the power of a drive system of a vehicle turns off from any cause, such as driver's erroneous operation of a start/stop switch of the vehicle during travelling, generation of driving force by a drive device, such as an engine and a drive motor, is stopped, and the vehicle coasts. In this case, in order to cause the vehicle to appropriately travel thereafter, it may be desired to allow a restart of the drive system while coasting.

Japanese Patent Application Publication No. 2004-92623 (JP 2004-92623 A) describes a technique for, when an engine stops while a vehicle is travelling, making it possible to restart the engine on the condition that a throttle opening degree of the engine is lower than or equal to a predetermined opening degree or in a state where the throttle opening degree of the engine is restricted to at or below the predetermined opening degree.

If the drive device operates again as a result of a restart of the drive system while the vehicle is coasting as described above, driving force from the drive device can suddenly recover. Particularly, if the drive system is restarted in a state where a driver is operating an accelerator pedal, driving force from the drive device steeply recovers immediately after the restart of the drive system. Then, in the technique described in JP 2004-92623 A, when a restart of the engine is required while the vehicle is coasting, that is, in a state where the engine is stopped while the vehicle is traveling, and when the throttle opening degree of the engine is higher than the predetermined opening degree, a restart of the engine is prohibited.

SUMMARY OF THE INVENTION

However, there is a case where, even when the throttle opening degree is lower than or equal to the predetermined opening degree but when the throttle opening degree does not decrease after a restart of the drive system, the drive system should not be restarted. In the technique described in JP 2004-92623 A, a restart condition for the drive system is that the throttle opening degree of the engine is lower than or equal to the predetermined opening degree, so the output of driving force is uniformly suppressed at the time of a restart of the drive system. Therefore, it is not possible to appropriately respond to a driver's driving force request.

The invention provides a vehicle that is able to suppress a variation in vehicle driving force when a drive system of the vehicle is restarted while the vehicle is coasting, and a control method for the vehicle.

In addition, the invention provides a vehicle that is able to respond to a driver's driving force request when the drive system of the vehicle is restarted while the vehicle is coasting, and a control method for the vehicle.

A first aspect of the invention provides a vehicle. The vehicle includes an accelerator pedal, a drive device and a control device. The accelerator pedal is configured to be operated by a driver. The drive device is configured to generate driving force for driving a wheel on the basis of an operation amount of the accelerator pedal. The control device is configured to, while the vehicle is travelling in a first state where driving force from the drive device is suppressed, prohibit a shift into a second state where generation of the driving force based on the operation amount of the accelerator pedal is allowed, until the operation amount of the accelerator pedal once becomes lower than a predetermined value.

The control device may be configured to, when a state where a fluctuation range of the operation amount of the accelerator pedal is smaller than a predetermined range has been detected while the vehicle is travelling in the first state, prohibit a shift into the second state until the operation amount once becomes lower than the predetermined value thereafter.

The control device may be configured to increase the predetermined range as the operation amount of the accelerator pedal increases. In addition, the control device may be configured to, while the vehicle is travelling in the first state, prohibit a shift into the second state until the accelerator pedal is once placed in a non-operated state.

The vehicle according to the first aspect may further include an operation switch configured to be used by the driver to operate a shift between the first state and the second state, and the control device may be configured to, while the vehicle is travelling in the first state, prohibit a shift into the second state by invalidating input of the operation switch.

The drive device may include at least one of an internal combustion engine and a rotating electrical machine.

In the vehicle according to the first aspect, the predetermined value may be set such that a fluctuation range of the operation amount of the accelerator pedal is smaller than a predetermined range.

The control device may be configured to increase the predetermined range as the operation amount of the accelerator pedal increases.

The vehicle according to the first aspect may further include an operation switch configured to be used by the driver to operate a shift between the first state and the second state, and the control device may be configured to, while the vehicle is travelling in the first state, prohibit a shift into the second state by invalidating input of the operation switch.

The drive device may include at least one of an internal combustion engine and a rotating electrical machine.

A second aspect of the invention provides a control method for a vehicle. The vehicle includes an accelerator pedal and a drive device. The accelerator pedal is configured to be operated by a driver. The drive device is configured to generate driving force for driving a wheel on the basis of an operation amount of the accelerator pedal. The control method includes: determining whether the vehicle is travelling in a first state where driving force from the drive device is suppressed; and, when it is determined that the vehicle is travelling in the first state, prohibiting a shift into a second state where generation of the driving force based on the operation amount of the accelerator pedal is allowed, until the operation amount of the accelerator pedal once becomes lower than a predetermined value.

The predetermined value may be set such that a fluctuation range of the operation amount of the accelerator pedal is smaller than a predetermined range.

According to the first and second aspects, it is determined whether to shift into the second state where generation of driving force based on the operation amount of the accelerator pedal is allowed on the basis of a behavior of the accelerator pedal while the vehicle is travelling in the first state where driving force from the drive device is suppressed. Specifically, while the vehicle is travelling in the first state, a shift into the second state is prohibited until the operation amount of the accelerator pedal once becomes lower than the predetermined value. Thus, a shift into the second state in a state where depression of the accelerator pedal is not loosened even once is suppressed while the vehicle is travelling in the first state. Thus, according to these aspects, when the drive system of the vehicle is restarted while the vehicle is coasting, it is possible to suppress a variation in vehicle driving force, which is not intended by the driver.

In addition, according to the first and second aspects, while the vehicle is travelling in the first state, when the operation amount of the accelerator pedal once becomes lower than the predetermined value, a shift into the second state is allowed. That is, when depression of the accelerator pedal is once loosened by the driver intentionally, a shift into the second state is allowed irrespective of the operation amount of the accelerator pedal thereafter. Thus, according to these aspects, it is possible to appropriately respond to a driver's driving force request at the time of a restart of the drive system while the vehicle is coasting.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. Like reference numerals denote the same or corresponding portions in the drawings, and the description thereof will not be repeated.

Figure 1:
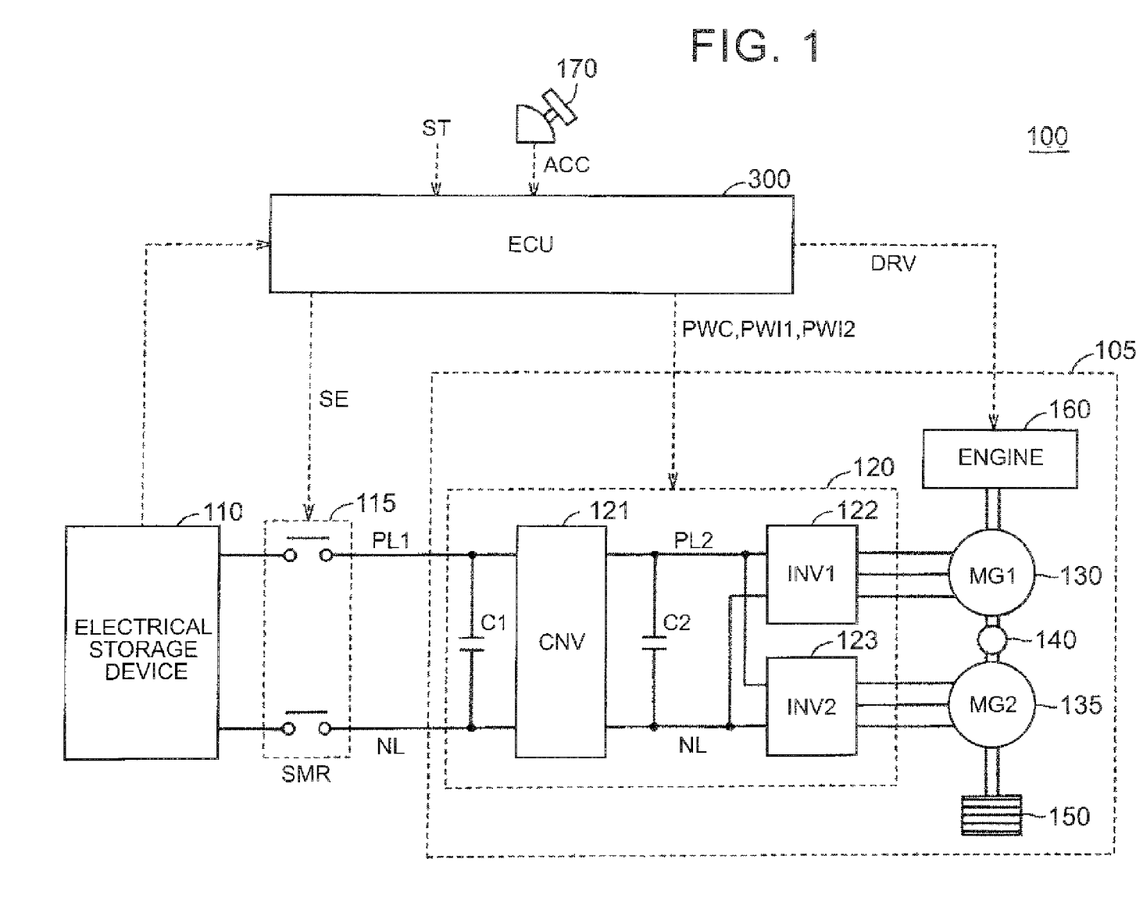
FIG. 1 is an overall block diagram of a vehicle according to a first embodiment of the invention.

FIG. 1 is an overall block diagram of a vehicle according to a first embodiment of the invention. As shown in FIG. 1, the vehicle 100 includes a drive device 105, an electrical storage device 110, a system main relay (hereinafter, referred to as "SMR") 115, an accelerator pedal 170 and an electronic control unit (hereinafter, referred to as "ECU") 300.

The drive device 105 includes a power control unit (hereinafter, referred to as "PCU") 120, motor generators 130, 135, a power transmission gear 140, a drive wheel 150 and an engine 160. The PCU 120 includes a converter 121, inverters 122, 123, and capacitors C1, C2.

The electrical storage device 110 is a rechargeable direct-current power supply, and is, for example, formed of a secondary battery, such as a lithium ion battery, nickel metal hydride battery and a lead-acid battery. The electrical storage device 110 is electrically connected to the PCU 120 of the drive device 105 via power lines PL1, NL, and supplies electric power for generating the driving force of the vehicle 100 to the PCU 120. In addition, the electrical storage device 110 stores electric power generated by the motor generators 130, 135. An electrical storage element, such as an electric double layer capacitor, may be employed as the electrical storage device 110 instead of a secondary battery.

The SMR 115 is provided between the electrical storage device 110 and the PCU 120. The SMR 115 switches between supply and interruption of electric power between the electrical storage device 110 and the PCU 120 on the basis of a control signal SE from the ECU 300. The converter 121 converts voltage between the power lines PL1, NL and the power lines PL2, NL on the basis of a control signal PWC from the ECU 300.

The inverters 122, 123 are connected in parallel with the power lines PL2, NL. The inverter 122 converts direct-current power, which is supplied from the converter 121, to alternating-current power on the basis of a control signal PWI1 from the ECU 300, and drives the motor generator 130. The inverter 123 converts direct-current power, which is supplied from the converter 121, to alternating-current power on the basis of a control signal PWI2 from the ECU 300, and drives the motor generator 135.

The capacitor C1 is electrically connected between the power lines PL1, NL, and reduces alternating-current components in voltage fluctuations between the power lines PL1, NL. The capacitor C2 is electrically connected between the power lines PL2, NL, and reduces alternating-current components in voltage fluctuations between the power lines PL2, NL.

The motor generators 130, 135 each are an alternating-current rotating electrical machine, and are, for example, a permanent magnet-type synchronous motor that includes a rotor in which a permanent magnet is embedded. The output torque of each of the motor generators 130, 135 is transmitted to the drive wheel 150 via the power transmission gear 140, and propels the vehicle 100. The power transmission gear 140 includes a speed reducer and a power split device typically a planetary gear unit. Each of the motor generators 130, 135 is able to generate electric power upon reception of the rotational force of the drive wheel 15 at the time of braking operation of the vehicle 100. The generated electric power is converted by the PCU 120 to charging electric power for charging the electrical storage device 110.

Each of the motor generators 130, 135 is coupled to the engine 160 via the power transmission gear 140. The engine 160 is controlled by a control signal DRV from the ECU 300. The motor generators 130, 135 and the engine 160 are cooperatively controlled by the ECU 300, and generate required vehicle driving force. Furthermore, each of the motor generators 130, 135 is able to generate electric power by the rotation of the engine 160 or the rotation of the drive wheel 150, and is able to charge the electrical storage device 110 with the generated electric power. In the first embodiment, the motor generator 135 is exclusively used as an electric motor for driving the drive wheel 150, and the motor generator 130 is exclusively used as a generator that is driven by the engine 160.

A rotary shaft of the motor generator 130 (MG1) is connected to a sun gear of the planetary gear unit (not shown) included in the power transmission gear 140. A rotary shaft of the motor generator 135 (MG2) is connected to a ring gear of the planetary gear unit via a speed reducer. An output shaft of the engine 160 is connected to a planetary carrier of the planetary gear unit. With such a connection state, the power transmission gear 140 also functions as a continuously variable transmission. Although not shown in FIG. 1, an additional transmission may be provided in the drive device 105.

The accelerator pedal 170 is operated by a driver, and its operation amount (hereinafter, also referred to as "accelerator operation amount") ACC is output to the ECU 300. The ECU 300 basically controls driving force, which is generated by the drive device 105, on the basis of the accelerator operation amount ACC. The ECU 300 controls the motor generators 130, 135 and the engine 160 on the basis of a required power based on the operation amount of the accelerator pedal 170, a vehicle speed, a state of charge (SOC) of the electrical storage device 110, and the like.

The ECU 300 includes a central processing unit (CPU), a storage device and input/output buffers (all are not shown). The ECU 300 receives signals from sensors, and the like, and outputs control signals to devices, and then controls the vehicle 100 and the devices. Control over the vehicle 100 and the devices are not limited to software processing but may also be processed by exclusive hardware (electronic circuit).

The ECU 300 acquires a start-up request signal ST indicating a system start-up request of the vehicle 100. The system start-up request is a request to set a control state of a drive system of the vehicle 100 (hereinafter, simply referred to as "vehicle system") including the drive device 105 to a start-up state (hereinafter, referred to as "ready-on state"). The start-up request signal ST is generated by driver's operation of a start switch, ignition key, or the like.

When the start switch, the ignition key, or the like, is operated in the ready-on state, a system stop of the vehicle 100 is required. The system stop request is a request to set the control state of the vehicle system to a stop state (hereinafter, referred to as "ready-off state"). The ECU 300 switches the control state of the vehicle system to any one of the ready-on state and the ready-off state.

In the ready-on state, the ECU 300 allows generation of driving force from the drive device 105 on the basis of driver's accelerator pedal operation. Specifically, in the ready-on state, the SMR 115 is closed, and the operation of the PCU 120 (control over each of the motor generators 130, 135) is enabled. In the ready-on state, the other devices (not shown) are also set in an operable state.

On the other hand, in the ready-off state, the ECU 300 does not allow generation of driving force from the drive device 105 on the basis of driver's accelerator pedal operation. Specifically, in the ready-off state, the operation of the PCU 120 is stopped, and the engine 160 is also set in a stop state. Thus, in the ready-off state, driving force is not generated even when the driver operates the accelerator pedal 170.

In the thus configured vehicle 100, when the vehicle system enters the ready-off state due to driver's erroneous operation of the start switch, the ignition key, or the like, while the vehicle 100 is travelling (ready-on state), the vehicle continues coasting (travelling by inertia) in a state where generation of driving force is stopped. In this case, required driving force is not ensured, so the driver may attempt to restart the vehicle system to return the vehicle system to the ready-on state.

In the first embodiment, when a start-up of the vehicle system is required by the driver while the vehicle is travelling (coasting) in the ready-off state, the ECU 300 prohibits a shift into the ready-on state until the operation amount of the accelerator pedal 170 once becomes lower than or equal to a predetermined value. Thus, a shift into the ready-on state in a state where depression of the accelerator pedal 170 is not loosened is suppressed, so sudden recovery of driving force as a result of return to the ready-on state is suppressed.

More specifically, when the vehicle system enters the ready-off state while the vehicle is travelling, if the accelerator operation amount exceeds the predetermined value, the ECU 300 sets an accelerator high operation amount flag to an on state. The accelerator high operation amount flag indicates that the accelerator operation amount is a high operation amount. That is, the predetermined value is set to a threshold at which fluctuations in driving force are excessive at the time of return to the ready-on state. The ECU 300 does not set the accelerator high operation amount flag to an off state until the accelerator operation amount once becomes lower than the predetermined value. That is, the predetermined value may be set to a threshold at which fluctuations in driving force are not excessive at the time of return to the ready-on state, and may be the same value as the predetermined value at which the accelerator high operation amount flag is set to the on state or may be a value different from the predetermined value. The ECU 300 prohibits a shift into the ready-on state while the accelerator high operation amount flag is set in the on state. Thus, fluctuations in driving force at the time of return to the ready-on state are suppressed.

In the first embodiment, when the operation amount of the accelerator pedal 170 once becomes lower than the predetermined value, the ECU 300 sets the accelerator high operation amount flag to the off state, and allows a shift into the ready-on state. That is, when depression of the accelerator pedal 170 is once loosened intentionally by the driver, the ECU 300 allows a shift into the ready-on state irrespective of the operation amount of the accelerator pedal 170 thereafter. Thus, at the time of a shift into the ready-on state, it is possible to appropriately respond to a driver's driving force request (for example, whether to output driving force).

If a shift into the ready-on state is allowed on the condition that the operation amount of the accelerator pedal 170 is lower than the predetermined value, output of driving force is uniformly suppressed at the time of a shift into the ready-on state. Thus, in this case, it is not possible to respond to a driving force request of the driver who desires output of driving force together with a shift into the ready-on state.

Prohibition of a shift into the ready-on state may be implemented by invalidating driver's operation of the start switch, ignition key, or the like, while the accelerator high operation amount flag is set in the on state.

Figure 2:
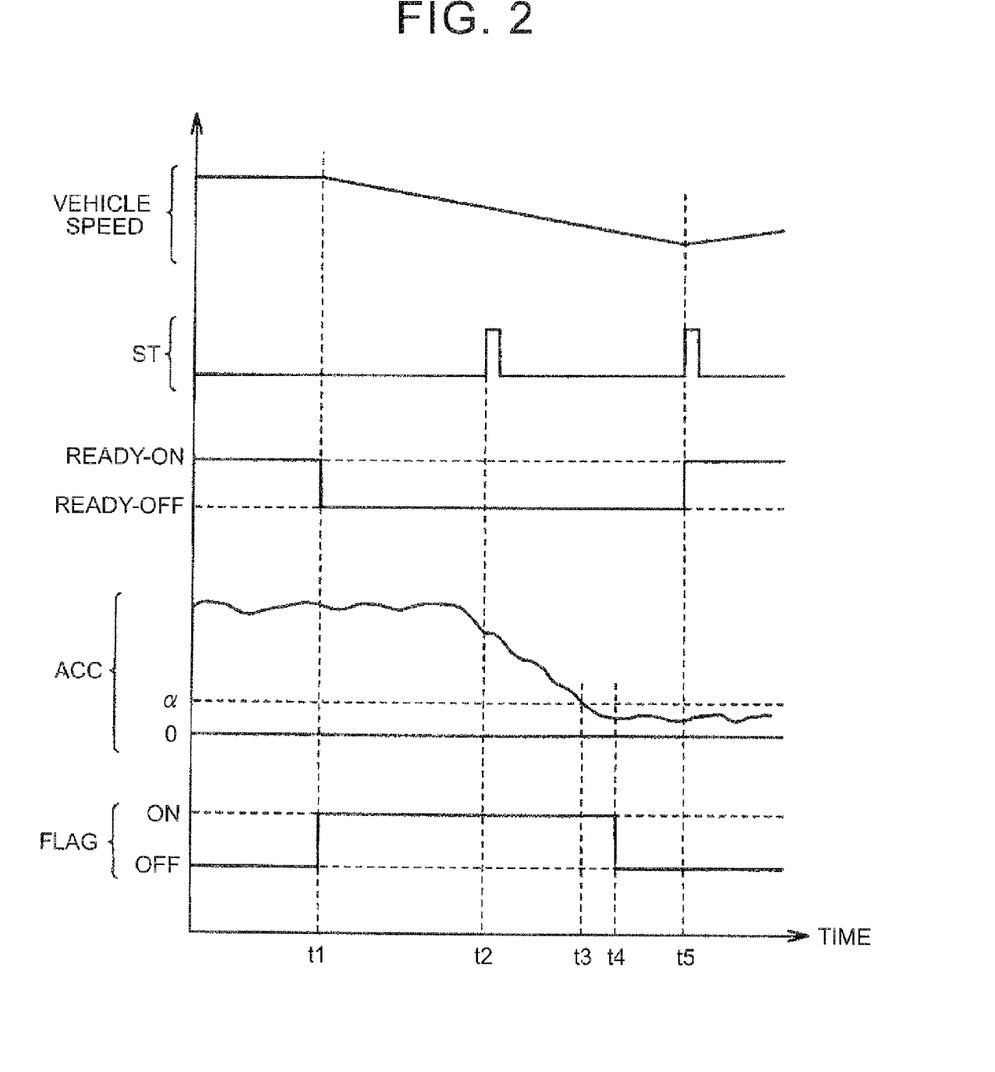
FIG. 2 is a timing chart that shows an example of operation of the vehicle when a vehicle system enters a ready-off state while the vehicle is travelling.

FIG. 2 is a timing chart that shows an example of operation of the vehicle 100 when the vehicle system enters the ready-off state while the vehicle is travelling. As shown in FIG. 2, it is assumed that, at time t1, a shift from the ready-on state to the ready-off state has occurred while the vehicle is travelling. For example, if the start switch, the ignition key, or the like, is erroneously operated by the driver or any system error has been detected, the vehicle system enters the ready-off state.

At time t1, the accelerator operation amount ACC is higher than a predetermined value $\alpha$, the above-described accelerator high operation amount flag is set to the on state together with a shift into the ready-off state. While the accelerator high operation amount flag is set in the on state, even when the start-up request signal ST arises, the control state of the vehicle system does not return to the ready-on state (time t2).

When the accelerator operation amount ACC becomes lower than the predetermined value $\alpha$ at time t3, the accelerator high operation amount flag is set to the off state at time t4 after a lapse of a predetermined period of time. Here, the same predetermined value $\alpha$ is used for the ON condition in which the accelerator high operation amount flag is set to the on state at time t1 and the OFF condition in which the accelerator high operation amount flag is set to the off state at time t4. Instead, the predetermined value for the ON condition and the predetermined value for the OFF condition may be different values.

At time t5, when the start-up request signal ST arises, the accelerator high operation amount flag is set in the off state at this time, so the vehicle system returns to the ready-on state in accordance with the start-up request signal ST.

In this way, in the first embodiment, when the accelerator operation amount ACC exceeds the predetermined value at the time when the vehicle system enters the ready-off state while the vehicle is travelling, the accelerator high operation amount flag is set to the on state. While the accelerator high operation amount flag is set in the on state, return to the ready-on state is prohibited. When the accelerator operation amount ACC once becomes lower than the predetermined value, the accelerator high operation amount flag is set to the off state, and return to the ready-on state is allowed.

Figure 3:
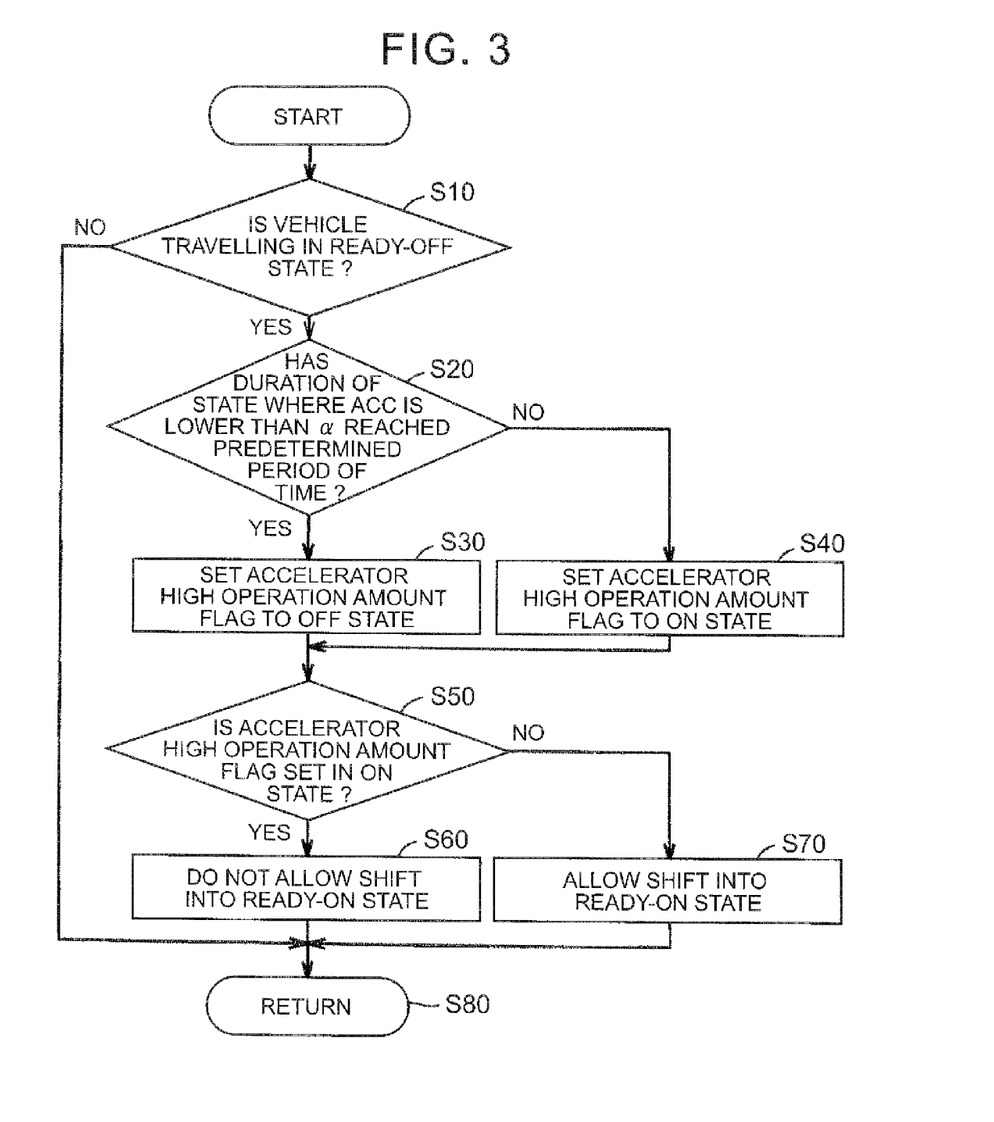
FIG. 3 is a flowchart that illustrates a process that is executed by an ECU when the vehicle system enters the ready-off state while the vehicle is travelling.

FIG. 3 is a flowchart that illustrates a process that is executed by the ECU 300 when the vehicle system enters the ready-off state while the vehicle is travelling. The process of the flowchart is called from a main routine and executed at set time intervals or each time a predetermined condition is satisfied. Alternatively, part or all of the steps may be processed by exclusive hardware (electronic circuit).

As shown in FIG. 1 together with FIG. 3, the ECU 300 determines whether the vehicle 100 is travelling and the vehicle system is placed in the ready-off state (step S10). It may be determined through, for example, detection of a vehicle speed whether the vehicle is travelling. When it is determined that the vehicle 100 is not travelling or the vehicle system is not placed in the ready-off state (that is, the ready-on state) (NO in step S10), the ECU 300 proceeds with the process to step S80 without executing the following series of processes.

When it is determined in step S10 that the vehicle 100 is travelling and the vehicle system is placed in the ready-off state (YES in step S10), the ECU 300 determines whether the duration of a state where the accelerator operation amount ACC is lower than the predetermined value $\alpha$ has reached a predetermined period of time (step S20). As described above, the predetermined value $\alpha$ is set to a value at which fluctuations in driving force are not excessive at the time of return to the ready-on state. The predetermined period of time is set in order to ensure that the accelerator operation amount ACC is lower than the predetermined value $\alpha$; however, the predetermined period of time may not be provided necessarily.

When it is determined in step S20 that the accelerator operation amount ACC is lower than the predetermined value $\alpha$ (YES in step S20), the ECU 300 sets the accelerator high operation amount flag to the off state if the accelerator high operation amount flag is set in the on state (step S30). On the other hand, when it is determined in step S20 that the accelerator operation amount ACC is not lower than the predetermined value $\alpha$, that is, the accelerator operation amount ACC is higher than or equal to the predetermined value $\alpha$ (NO in step S20), the ECU 300 sets the accelerator high operation amount flag to the on state (step S40).

Subsequently, the ECU 300 determines whether the accelerator high operation amount flag is set in the on state (step S50). When it is determined that the accelerator high operation amount flag is set in the on state (YES in step S50), the ECU 300 does not allow a shift (return) to the ready-on state (step S60). Thus, in this case, even when there arises the start-up request signal ST, the vehicle system does not enter the ready-on state.

On the other hand, when it is determined in step S50 that the accelerator high operation amount flag is set in the off state (NO in step S50), the ECU 300 allows a shift (return) to the ready-on state (step S70). Thus, when the start-up request signal ST arises after that, the ECU 300 sets the vehicle system to the ready-on state in accordance with the start-up request signal ST.

In the above description, a shift (return) to the ready-on state is prohibited until the accelerator operation amount ACC once becomes lower than the predetermined value $\alpha$, so a shift (return) to the ready-on state may be prohibited until the accelerator pedal 170 once enters a non-operated state.

As described above, in the first embodiment, while the vehicle is travelling in the ready-off state, it is determined whether to shift into the ready-on state on the basis of the behavior of the accelerator pedal 170. Specifically, while the vehicle is travelling in the ready-off state, a shift into the ready-on state is prohibited until the accelerator operation amount ACC once becomes lower than the predetermined value. Thus, a shift into the ready-on state in a state where depression of the accelerator pedal 170 is not loosened even once is suppressed while the vehicle is travelling in the ready-off state. Thus, according to the first embodiment, when the drive system of the vehicle 100 is restarted while the vehicle is coasting, it is possible to suppress a variation in vehicle driving force, which is not intended by the driver.

In addition, in the first embodiment, while the vehicle is travelling in the ready-off state, when the operation amount of the accelerator pedal 170 once becomes lower than the predetermined value, a shift into the ready-on state is allowed. That is, when depression of the accelerator pedal 170 is once loosened by the driver intentionally, a shift into the ready-on state is allowed irrespective of the operation amount of the accelerator pedal 170 thereafter. Thus, according to the first embodiment, at the time of a restart of the drive system while the vehicle is coasting, it is possible to appropriately respond to driver's driving force request.

In the above description, when the vehicle system enters the ready-off state while the vehicle is travelling, a shift (return) into the ready-on state is prohibited when the accelerator high operation amount flag is set in the on state. Instead, it is applicable that, while a shift (return) into the ready-on state is allowed in accordance with the start-up request signal ST, the output of driving force is disabled when the accelerator high operation amount flag is set in the on state.

The overall configuration of a vehicle according to an alternative embodiment to the first embodiment is the same as the configuration of the vehicle 100 according to the first embodiment shown in FIG. 1.

Figure 4:
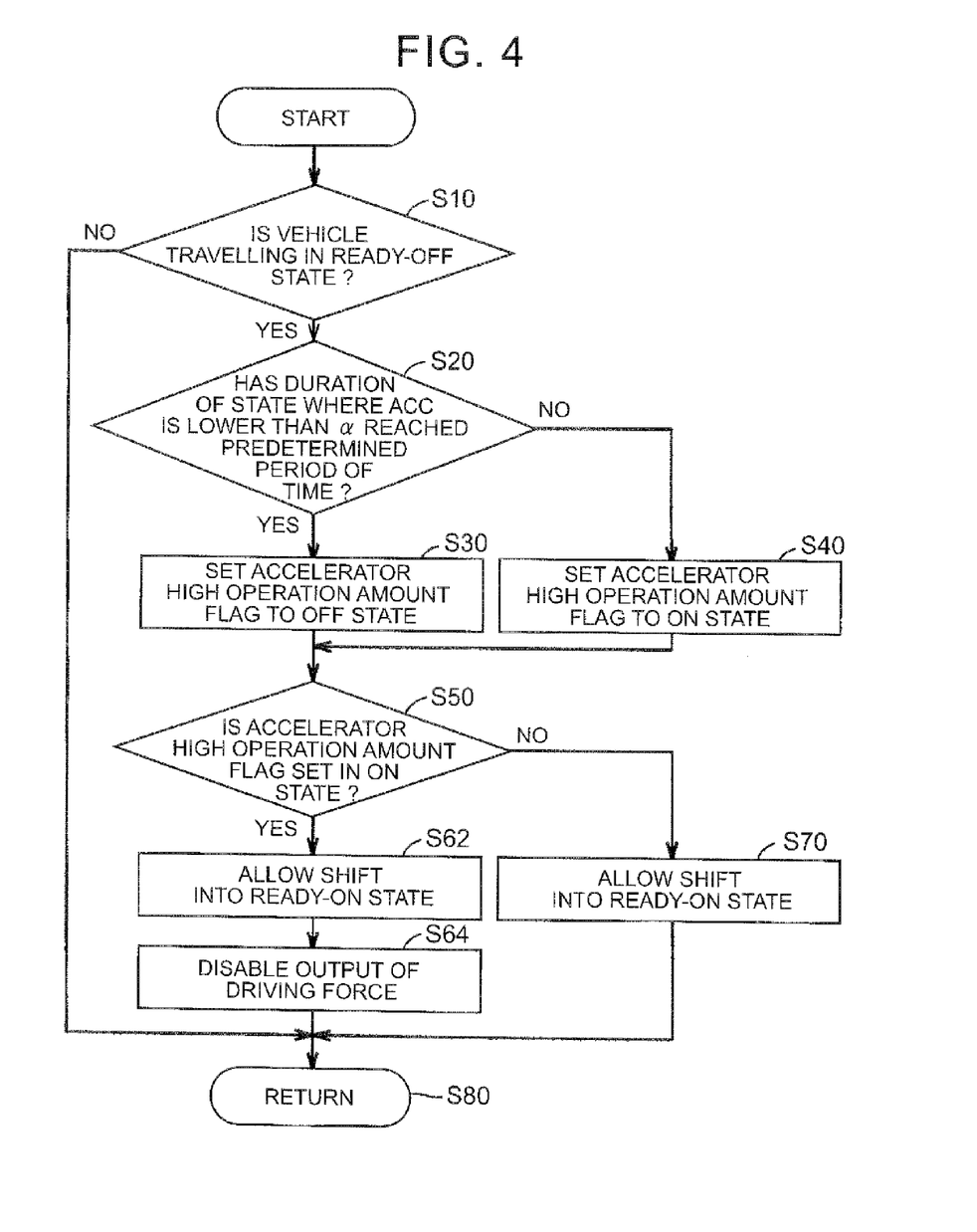
FIG. 4 is a flowchart that illustrates a process that is executed by the ECU when the vehicle system enters the ready-off state while the vehicle is travelling according to an alternative embodiment to the first embodiment.

FIG. 4 is a flowchart that illustrates a process that is executed by the ECU 300 when the vehicle system enters the ready-off state while the vehicle is travelling according to the alternative embodiment to the first embodiment. As shown in FIG. 4, the flowchart differs from the flowchart according to the first embodiment shown in FIG. 3 in that step S62 and step S64 are included instead of step S60.

That is, when it is determined in step S50 that the accelerator high operation amount flag is set in the on state (YES in step S50), the ECU 300 allows a shift (return) into the ready-on state (step S62). Subsequently, the ECU 300 disables the output of driving force by the drive device 105 (FIG. 1) (step S64).

On the other hand, when it is determined in step S50 that the accelerator high operation amount flag is set in the off state (NO in step S50), the process proceeds to step S70, and a shift (return) into the ready-on state is allowed. In this case, the output of driving force by the drive device 105 is allowed, and the drive device 105 outputs driving force on the basis of operation of the accelerator pedal 170 thereafter.

According to the alternative embodiment to the first embodiment as well, as in the case of the first embodiment, it is possible to suppress a variation in vehicle driving force when the drive system of the vehicle 100 is restarted while the vehicle is coasting, and it is also possible to appropriately respond to a driver's driving force request at the time of a restart of the drive system while the vehicle is coasting.

A second embodiment differs from the first embodiment in the on/off conditions of the accelerator high operation amount flag. The overall configuration of the vehicle according to the second embodiment is the same as the configuration of the vehicle 100 according to the first embodiment shown in FIG. 1.

Figure 5:
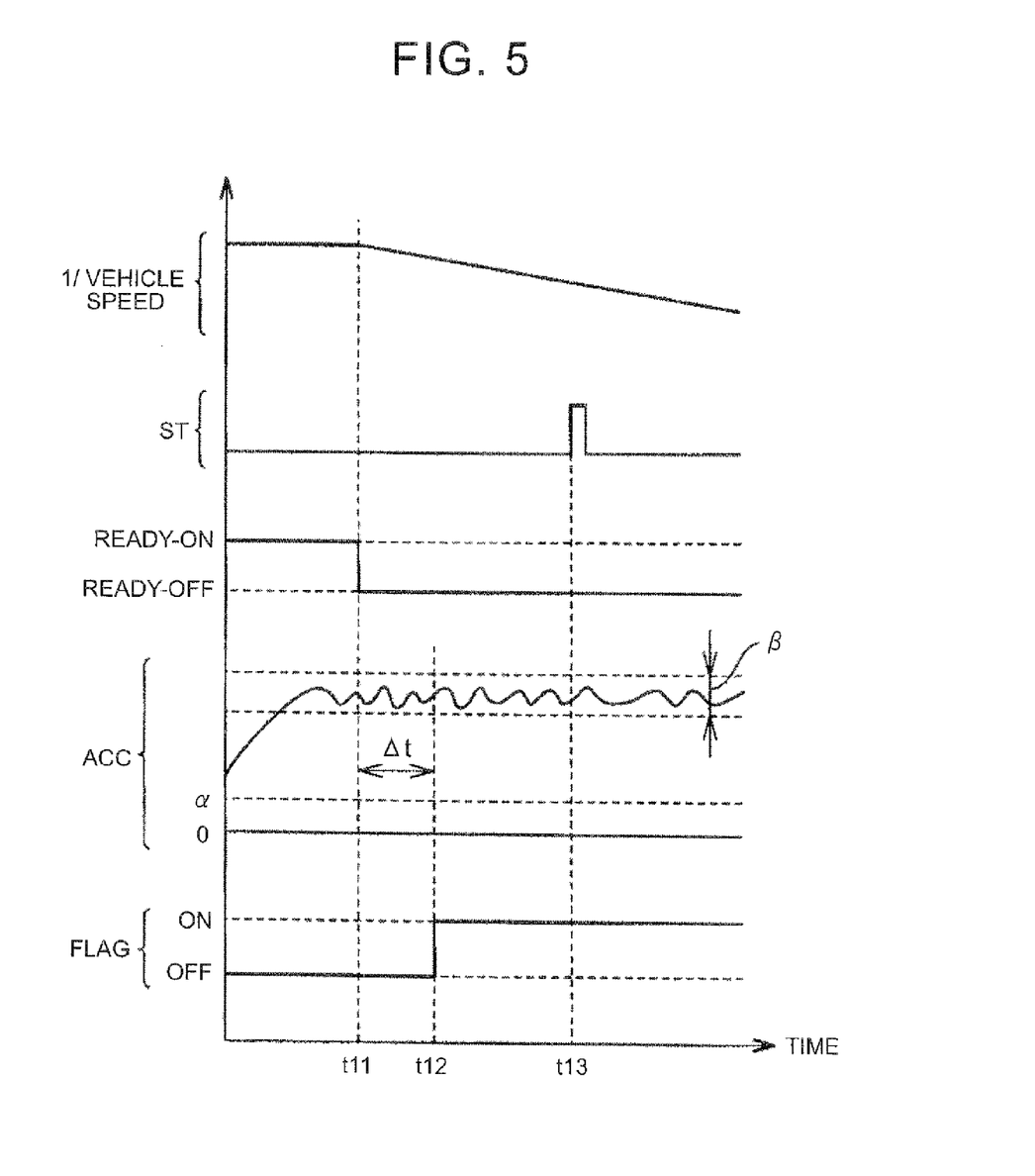
FIG. 5 is a timing chart that shows an example of operation of the vehicle when the vehicle system enters a ready-off state while the vehicle is travelling according to a second embodiment.

FIG. 5 is a timing chart that shows an example of operation of the vehicle 100 when the vehicle system enters the ready-off state while the vehicle is travelling according to the second embodiment. As shown in FIG. 5, it is assumed that, at time t11, a shift from the ready-on state to the ready-off state has occurred while the vehicle is travelling.

In the second embodiment, when it has been detected that the accelerator operation amount ACC is higher than or equal to the predetermined value $\alpha$ (nonzero) and a fluctuation range of the accelerator operation amount ACC is smaller than a predetermined range $\beta$, the accelerator high operation amount flag is set in the on state (time t12). That is, when the accelerator pedal 170 has been depressed to a certain amount and it is determined that there is no likelihood of return of the accelerator pedal 170 on the basis of a fluctuation amount of the accelerator operation amount ACC, the accelerator high operation amount flag is set to the on state, and a shift (return) into the ready-on state is prohibited (time t13).

When the predetermined value $\beta$ is too small, the number of cases where the accelerator high operation amount flag is set to the off state increases more than necessary; whereas, when the predetermined value $\beta$ is too large, it is not possible to appropriately detect return of the accelerator pedal 170. The predetermined range $\beta$ may be increased as the accelerator operation amount ACC increases. This is because, as the accelerator operation amount ACC increases, it is presumably required to more reliably detect the likelihood of return of the accelerator pedal 170.

A period of time $\Delta t$ is provided to determine whether the fluctuation range of the accelerator operation amount ACC is smaller than the predetermined range $\beta$. If the period of time $\Delta t$ is set so as to be long more than necessary, a shift into the ready-on state occurs when the start-up request signal ST arises during then. Therefore, the period of time $\Delta t$ is desirably shorter the better as long as it is possible to determine whether the fluctuation range of the accelerator operation amount ACC is smaller than the predetermined range $\beta$.

Figure 6:
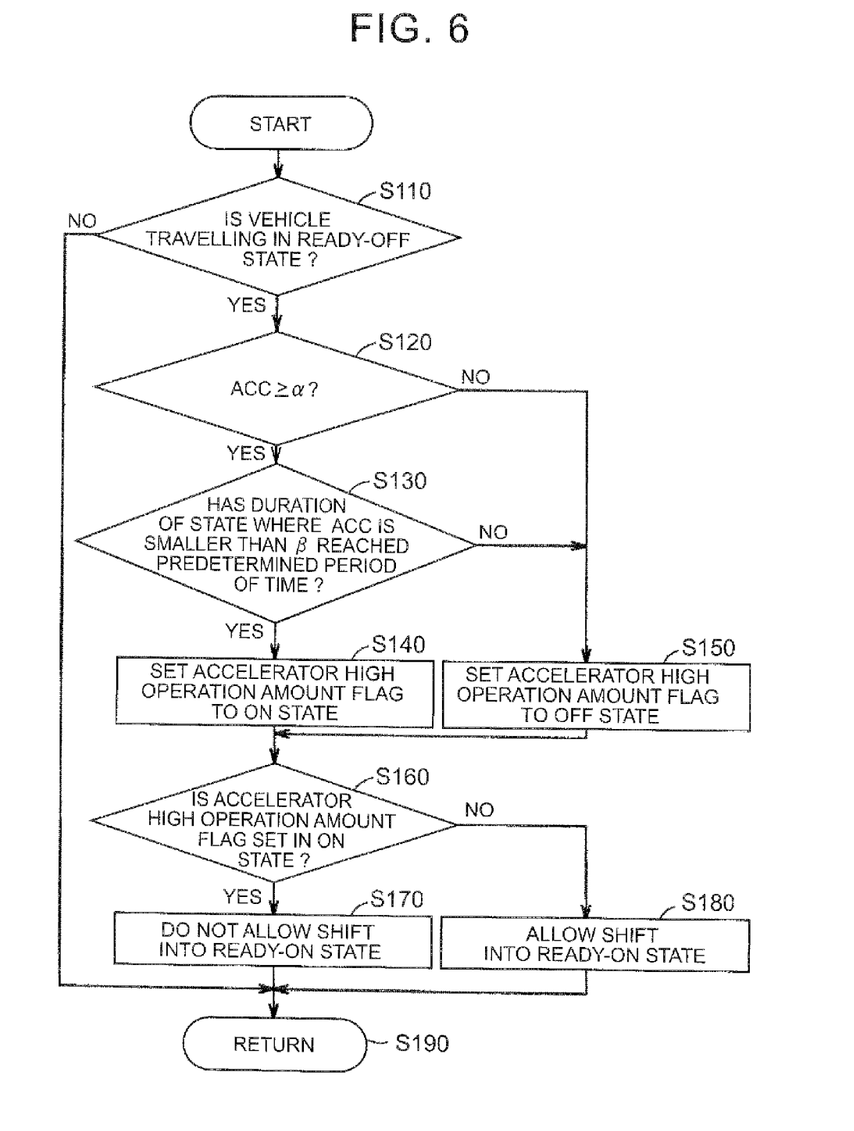
FIG. 6 is a flowchart that illustrates a process that is executed by the ECU when the vehicle system enters the ready-off state while the vehicle is travelling according to the second embodiment.

FIG. 6 is a flowchart that illustrates a process that is executed by the ECU 300 when the vehicle system enters the ready-off state while the vehicle is travelling according to the second embodiment. The process of the flowchart is also called from a main routine and executed at set time intervals or each time a predetermined condition is satisfied. Alternatively, part or all of the steps may be processed by exclusive hardware (electronic circuit).

As shown in FIG. 1 together with FIG. 6, the ECU 300 determines whether the vehicle 100 is travelling and the vehicle system is placed in the ready-off state (step S110). When it is determined that the vehicle 100 is not travelling or the vehicle system is not placed in the ready-off state (that is, the ready-on state) (NO in step S110), the process proceeds to step S190.

When it is determined in step S110 that the vehicle 100 is travelling and the vehicle system is placed in the ready-off state (YES in step S110), the ECU 300 determines whether the accelerator operation amount ACC is higher than or equal to the predetermined value $\alpha$ (nonzero) (step S120). When it is determined that the accelerator operation amount ACC is higher than or equal to the predetermined value $\alpha$ (YES in step S120), the ECU 300 determines whether the duration of a state where a fluctuation range $\Delta ACC$ of the accelerator operation amount ACC is smaller than the predetermined range $\beta$ has reached a predetermined period of time $\Delta t$ (step S130).

When it is determined that the duration of a state where the fluctuation, range $\Delta ACC$ is smaller than the predetermined range $\beta$ has reached the predetermined period of time $\Delta t$ (YES in step S130), the ECU 300 sets the accelerator high operation amount flag to the on state (step S140). On the other hand, when it is determined in step S120 that the accelerator operation amount ACC is lower than the predetermined value $\alpha$ (NO in step S120) or when it is determined in step S130 that the duration of a state where the fluctuation range $\Delta ACC$ of the accelerator operation amount ACC is smaller than the predetermined range $\beta$ has not reached the predetermined period of time $\Delta t$ (NO in step S130), the ECU 300 sets the accelerator high operation amount flag to the off state (step S150).

The following processes of step S160 to step S180 are respectively the same as those of step S50 to step S70 of the flowchart shown in FIG. 3.

As described above, in the second embodiment, while the vehicle is travelling in the ready-off state, it is determined whether to shift into the ready-on state on the basis of the behavior of the accelerator pedal 170. Specifically, while the vehicle is travelling in the ready-off state, a shift into the ready-on state is prohibited when the accelerator operation amount ACC is higher than or equal to the predetermined value $\alpha$ (nonzero) and the fluctuation range $\Delta ACC$ of the accelerator operation amount ACC is smaller than the predetermined range $\beta$. Thus, a shift into the ready-on state in a state where depression of the accelerator pedal 170 is not loosened is suppressed while the vehicle is travelling in the ready-off state. Thus, according to the second embodiment, it is possible to suppress a variation in vehicle driving force when the drive system of the vehicle 100 is restarted while the vehicle is coasting.

In addition, in the second embodiment, while the vehicle is travelling in the ready-off state, when the operation amount of the accelerator pedal 170 once becomes lower than the predetermined value or when the fluctuation amount of the operation amount becomes larger than the predetermined value, a shift into the ready-on state is allowed. That is, when the accelerator pedal 170 is operated by the driver intentionally as described above, a shift into the ready-on state is allowed irrespective of the operation amount of the accelerator pedal 170 thereafter. Thus, according to the second embodiment, at the time of a restart of the drive system while the vehicle is coasting, it is possible to appropriately respond to driver's driving force request.

In the above-described second embodiment as well, as in the case of the alternative embodiment to the first embodiment, it is applicable that, while a shift (return) into the ready-on state is allowed in accordance with the start-up request signal ST, the output of driving force is disabled when the accelerator high operation amount flag is set in the on state.

The overall configuration of a vehicle according to an alternative embodiment to the second embodiment is also the same as the configuration of the vehicle 100 according to the first embodiment shown in FIG. 1.

Figure 7:
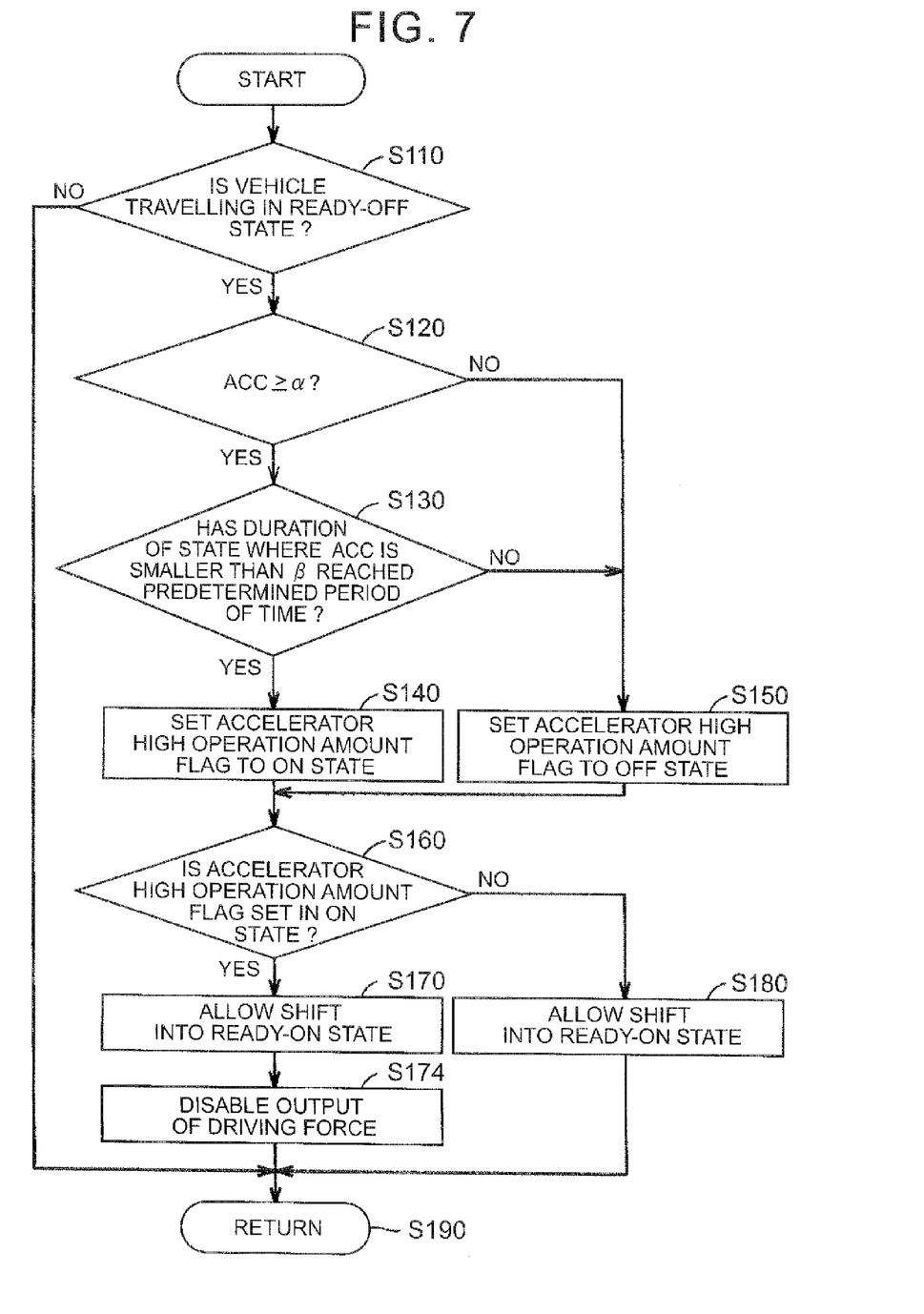
FIG. 7 is a flowchart that illustrates a process that is executed by the ECU when the vehicle system enters the ready-off state while the vehicle is travelling according to an alternative embodiment to the second embodiment.

FIG. 7 is a flowchart that illustrates a process that is executed by the ECU 300 when the vehicle system enters the ready-off state while the vehicle is travelling according to the alternative embodiment to the second embodiment. As shown in FIG. 7, the flowchart differs from the flowchart according to the second embodiment shown in FIG. 6 in that step S172 and step S174 are included instead of step S170.

That is, when it is determined in step S160 that the accelerator high operation amount flag is set in the on state (YES in step S160), the ECU 300 allows a shift (return) into the ready-on state (step S172). Furthermore, the ECU 300 disables the output of driving force by the drive device 105 (FIG. 1) (step S174). On the other hand, when it is determined in step S160 that the accelerator high operation amount flag is set in the off state (NO in step S160), the process proceeds to step S180, and a shift (return) into the ready-on state is allowed.

As described above, according to the alternative embodiment to the second embodiment as well, similar operation and advantageous effects to those of the second embodiment are obtained.

In a third embodiment, when it has been detected that the accelerator operation amount ACC is higher than or equal to the predetermined value α (nonzero) and the fluctuation range of the accelerator operation amount ACC is smaller than the predetermined range β, the accelerator high operation amount flag is set to the on state. The on state of the accelerator high operation amount flag is kept and a shift (return) into the ready-on state is prohibited until the accelerator operation amount ACC once becomes lower than a predetermined value (which may be the same value as the above-described predetermined value α or may be different from the above-described predetermined value α).

The overall configuration of the vehicle according to the third embodiment is the same as the configuration of the vehicle 100 according to the first embodiment shown in FIG. 1.

Figure 8:
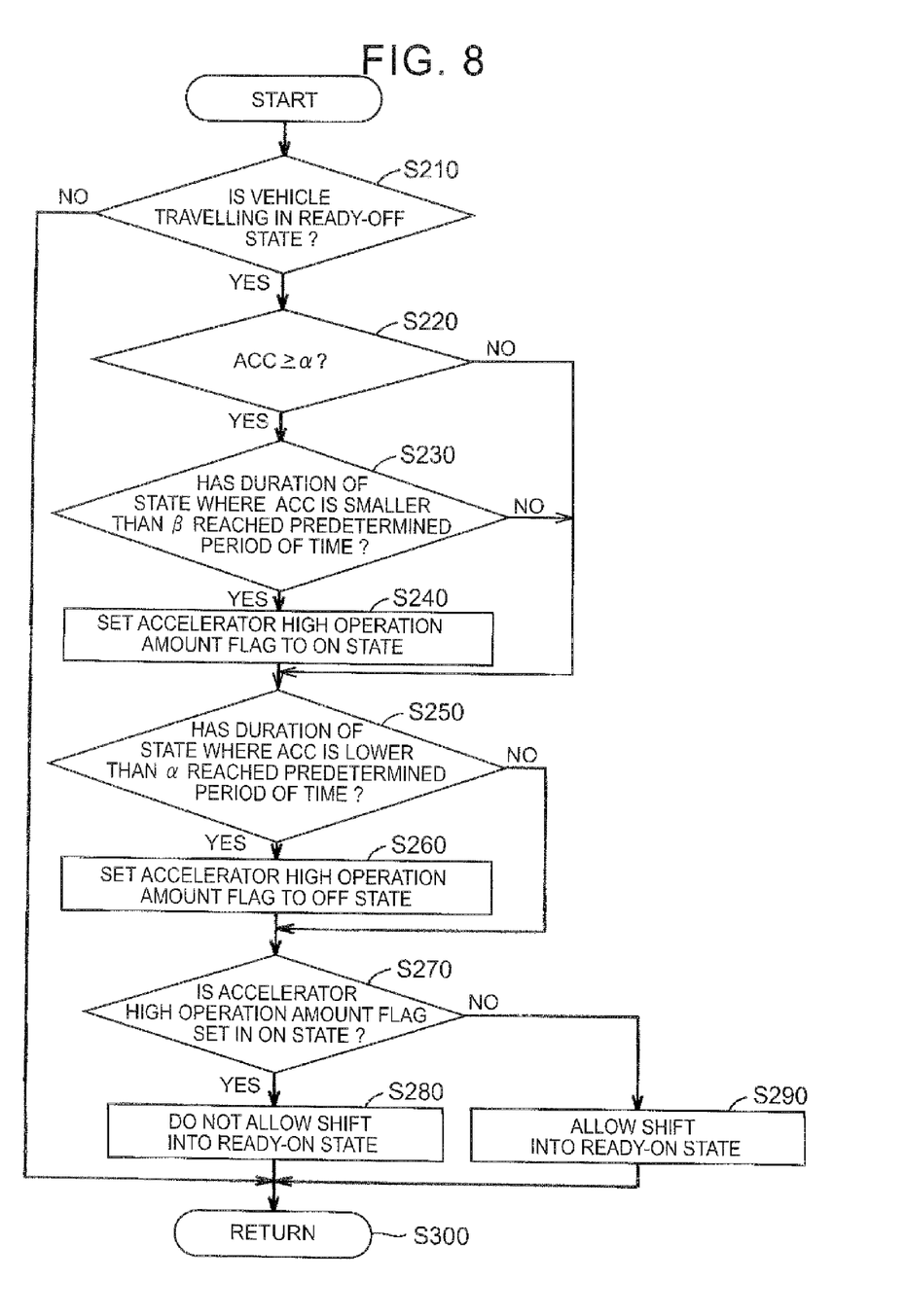
FIG. 8 is a flowchart that illustrates a process that is executed by the ECU when the vehicle system enters the ready-off state while the vehicle is travelling according to a third embodiment.

FIG. 8 is a flowchart that illustrates a process that is executed by the ECU 300 when the vehicle system enters the ready-off state while the vehicle is travelling according to the third embodiment. As shown in FIG. 8, the processes of step S210 to step S240 are respectively the same as those of step S110 to step S140 of the flowchart shown in FIG. 6.

When the accelerator high operation amount flag is set to the on state in step S240, the ECU 300 determines whether the duration of a state where the accelerator operation amount ACC is lower than the predetermined value α has reached the predetermined period of time (step S250). When it is determined in step S220 that the accelerator operation amount ACC is not higher than or equal to the predetermined value α (NO in step S220) or when it is determined in step S230 that the duration of a state where the fluctuation amount ΔACC of the accelerator operation amount ACC is smaller than the predetermined range β has not reached the predetermined period of time (NO in step S230) as well, the process proceeds to step S250, and it is determined whether the duration of a state where the accelerator operation amount ACC is lower than the predetermined value α has reached the predetermined period of time.

When it is determined in step S250 that the duration of a state where the accelerator operation amount ACC is lower than the predetermined value α has reached the predetermined period of time (YES in step S250), the ECU 300 sets the accelerator high operation amount flag to the off state if the accelerator high operation amount flag is set in the on state (step S260). When it is determined in step S250 that the duration of a state where the accelerator operation amount ACC is lower than the predetermined value α has not reached the predetermined period of time (NO in step S250), the process proceeds to step S270.

The following processes of step S270 to step S290 are respectively the same as those of step S50 to step S70 of the flowchart shown in FIG. 3.

In the above description as well, as described in the second embodiment, the predetermined range β may be increased as the accelerator operation amount ACC increases. In addition, in the above description, a shift (return) to the ready-on state is prohibited by keeping the on state of the accelerator high operation amount flag until the accelerator operation amount ACC once becomes lower than the predetermined value α; instead, a shift (return) to the ready-on state may be prohibited by keeping the on state of the accelerator high operation amount flag until the accelerator pedal 170 once enters a non-operated state.

As described above, in the third embodiment, the accelerator high operation amount flag is set to the on state when the accelerator operation amount ACC is higher than or equal to the predetermined value α (nonzero) and the fluctuation range ΔACC of the accelerator operation amount ACC is smaller than the predetermined range β. A shift into the ready-on state is prohibited by keeping the on state of the accelerator high operation amount flag until the accelerator operation amount ACC once becomes lower than the predetermined value. Thus, a shift into the ready-on state in a state where depression of the accelerator pedal 170 is not loosened is suppressed while the vehicle is travelling in the ready-off state. Thus, according to the third embodiment, it is possible to suppress a variation in vehicle driving force when the drive system of the vehicle 100 is restarted while the vehicle is coasting.

In addition, in the third embodiment as well, while the vehicle is travelling in the ready-off state, when the operation amount of the accelerator pedal 170 once becomes lower than the predetermined value, a shift into the ready-on state is allowed. That is, when depression of the accelerator pedal 170 is once loosened by the driver intentionally, a shift into the ready-on state is allowed irrespective of the operation amount of the accelerator pedal 170 thereafter. Thus, according to the third embodiment, at the time of a restart of the drive system while the vehicle is coasting, it is possible to appropriately respond to driver's driving force request.

In the above-described third embodiment as well, as in the case of the alternative embodiments to the first and second embodiments, it is applicable that, while a shift (return) into the ready-on state is allowed in accordance with the start-up request signal ST, the output of driving force is disabled when the accelerator high operation amount flag is set in the on state.

The overall configuration of a vehicle according to an alternative embodiment to the third embodiment is the same as the configuration of the vehicle 100 according to the first embodiment shown in FIG. 1.

Figure 9:
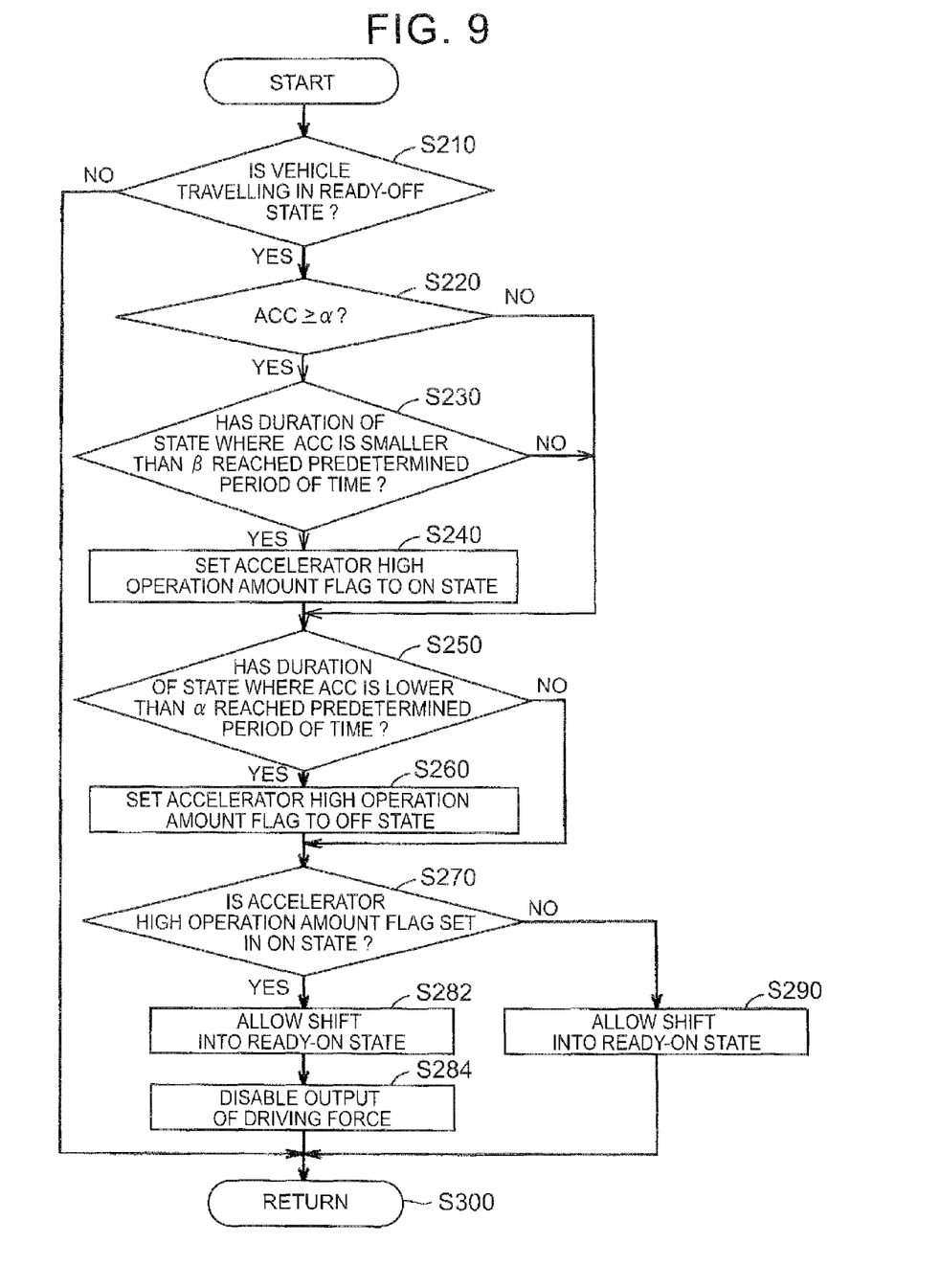
FIG. 9 is a flowchart that illustrates a process that is executed by the ECU when the vehicle system enters the ready-off state while the vehicle is travelling according to an alternative embodiment to the third embodiment.

FIG. 9 is a flowchart that illustrates a process that is executed by the ECU 300 when the vehicle system enters the ready-off state while the vehicle is travelling according to the alternative embodiment to the third embodiment. As shown in FIG. 9, the flowchart differs from the flowchart according to the third embodiment shown in FIG. 8 in that step S282 and step S284 are included instead of step S280.

That is, when it is determined in step S270 that the accelerator high operation amount flag is set in the on state (YES in step S270), the ECU 300 allows a shift (return) into the ready-on state (step S282). Furthermore, the ECU 300 disables the output of driving force by the drive device 105 (FIG. 1) (step S284). On the other hand, when it is determined in step S270 that the accelerator high operation amount flag is set in the off state (NO in step S270), the process proceeds to step S290, and a shift (return) into the ready-on state is allowed.

As described above, according to the alternative embodiment to the third embodiment as well, similar operation and advantageous effects to those of the third embodiment are obtained.

In the above-described embodiments, the PCU 120 and the engine 160 stop and driving force becomes zero due to the fact that the vehicle system enters the ready-off state while the vehicle is travelling; instead, the vehicle may be caused to travel while driving force is being suppressed. Specifically, if the start switch, the ignition key, or the like, is erroneously operated by the driver while the vehicle is travelling, driving force may be suppressed by, for example, setting the engine 160 in an idling state, setting a clutch to a separated state or a slipped state where a clutch is present at a drive shaft.

In the above-described embodiments, the description is made on an example of the configuration of a hybrid vehicle in which two motor generators are provided; however, the number of the motor generators is not limited to this number; instead, a hybrid vehicle including one or three or more motor regenerators may be employed. The invention is also applicable to a vehicle other than a hybrid vehicle. The vehicle may be an electric vehicle or a fuel cell vehicle that does not include an engine, or may be an existing vehicle that uses only an engine as a drive source.

The embodiments described above should be regarded as only illustrative in every respect and not restrictive. The scope of the invention is defined by the appended claims rather than the above-described embodiments. The scope of the invention is intended to encompass all modifications within the scope of the appended claims and equivalents thereof.

What is claimed is:

1. A vehicle comprising:
an accelerator pedal configured to be operated by a driver;
a drive device configured to generate driving force for driving a wheel on the basis of an operation amount of the accelerator pedal; and
a control device configured to, while the vehicle is travelling in a first state where driving force from the drive device is suppressed, prohibit a shift into a second state where generation of the driving force based on the operation amount of the accelerator pedal is allowed, until the operation amount of the accelerator pedal once becomes lower than a predetermined value.

2. The vehicle according to claim 1, wherein
the control device is configured to, when a state where a fluctuation range of the operation amount of the accelerator pedal is smaller than a predetermined range has been detected while the vehicle is travelling in the first state, prohibit a shift into the second state until the operation amount once becomes lower than the predetermined value thereafter.

3. The vehicle according to claim 2, wherein
the control device is configured to increase the predetermined range as the operation amount of the accelerator pedal increases.

4. The vehicle according to claim 1, wherein
the control device is configured to, while the vehicle is travelling in the first state, prohibit a shift into the second state until the accelerator pedal is once placed in a non-operated state.

5. The vehicle according to claim 1, further comprising:
an operation switch configured to be used by the driver to operate a shift between the first state and the second state, wherein
the control device is configured to, while the vehicle is travelling in the first state, prohibit a shift into the second state by invalidating input of the operation switch.

6. The vehicle according to claim 1, wherein
the drive device includes at least one of an internal combustion engine and a rotating electrical machine.

7. The vehicle according to claim 1, wherein
the predetermined value is set such that a fluctuation range of the operation amount of the accelerator pedal is smaller than a predetermined range.

8. The vehicle according to claim 7, wherein
the control device is configured to increase the predetermined range as the operation amount of the accelerator pedal increases.

9. The vehicle according to claim 7, further comprising:
an operation switch configured to be used by the driver to operate a shift between the first state and the second state, wherein
the control device is configured to, while the vehicle is travelling in the first state, prohibit a shift into the second state by invalidating input of the operation switch.

10. The vehicle according to claim 7, wherein
the drive device includes at least one of an internal combustion engine and a rotating electrical machine.

11. A control method for a vehicle, the vehicle including an accelerator pedal configured to be operated by a driver and a drive device configured to generate driving force for driving a wheel on the basis of an operation amount of the accelerator pedal, the control method comprising:
determining whether the vehicle is travelling in a first state where driving force from the drive device is suppressed; and
when it is determined that the vehicle is travelling in the first state, prohibiting a shift into a second state where generation of the driving force based on the operation amount of the accelerator pedal is allowed, until the operation amount of the accelerator pedal once becomes lower than a predetermined value.

12. The control method according to claim 11, wherein the predetermined value is set such that a fluctuation range of the operation amount of the accelerator pedal is smaller than a predetermined range.

* * * * *